United States Patent [19]

Ludewig et al.

[11] Patent Number: 5,729,345
[45] Date of Patent: Mar. 17, 1998

[54] APPARATUS AND METHOD FOR DETERMINING DISTORTION OF A WELDED MEMBER

[75] Inventors: Howard W. Ludewig, Groveland, Ill.; Adam Q. Moore, Davenport, Iowa; Ilhan Varol, Peoria, Ill.

[73] Assignee: Caterpillar Inc., Peoria, Ill.

[21] Appl. No.: 710,099

[22] Filed: Sep. 11, 1996

[51] Int. Cl.$^6$ ..................................................... G01B 11/14
[52] U.S. Cl. ........................ 356/394; 356/373; 356/375
[58] Field of Search ........................... 356/372, 373, 356/375, 376, 394, 4, 1, 2; 250/561, 208.3, 201.6, 560, 234–236; 33/503, 546, 551, 555, 707; 219/124.34, 125.1, 130.01, 125.12, 124.22, 130.21; 364/513, 559, 571, 477; 318/568, 568 H, 568 A, 568 B, 568 C, 568 D

[56] References Cited

U.S. PATENT DOCUMENTS

| | | | |
|---|---|---|---|
| 4,594,497 | 6/1986 | Takahashi et al. | 219/130 |
| 4,815,006 | 3/1989 | Andersson et al. | 364/513 |
| 4,990,743 | 2/1991 | Kugai et al. | 219/124 |
| 5,104,216 | 4/1992 | Vokurka | 356/2 |
| 5,151,608 | 9/1992 | Torii et al. | 250/561 |
| 5,206,474 | 4/1993 | Fukuoka et al. | 219/124 |
| 5,235,855 | 8/1993 | Patrick et al. | 73/622 |
| 5,275,327 | 1/1994 | Watkins et al. | 228/102 |
| 5,303,034 | 4/1994 | Carmichael et al. | 356/375 |
| 5,374,830 | 12/1994 | Pryor | 250/561 |
| 5,430,547 | 7/1995 | Takagi et al. | 356/375 |
| 5,495,090 | 2/1996 | Mukai et al. | 219/124 |
| 5,511,007 | 4/1996 | Nihei et al. | 364/571 |
| 5,550,347 | 8/1996 | Kasuya et al. | 219/137 |
| 5,582,750 | 12/1996 | Hamura et al. | 219/124 |
| 5,597,498 | 1/1997 | Sunayama et al. | 219/124 |

*Primary Examiner*—Frank G. Font
*Assistant Examiner*—Michael P. Stafira
*Attorney, Agent, or Firm*—Maginot & Addison

[57] ABSTRACT

A method for determining distortion of a member which results from the member being subjected to a welding operation is disclosed. The method includes the steps of (1) locating the member so that the member assumes a first position, (2) obtaining first data measurements of the member while the member is located in the first position, (3) performing the welding operation on the member whereby the member distorts and assumes a second position, (4) obtaining second data measurements of the member while the member is located in the second position, and (5) calculating distortion of the member based on the first data measurements and the second data measurements. An apparatus for determining distortion of a member which results from the member being subjected to a welding operation is also disclosed.

15 Claims, 4 Drawing Sheets

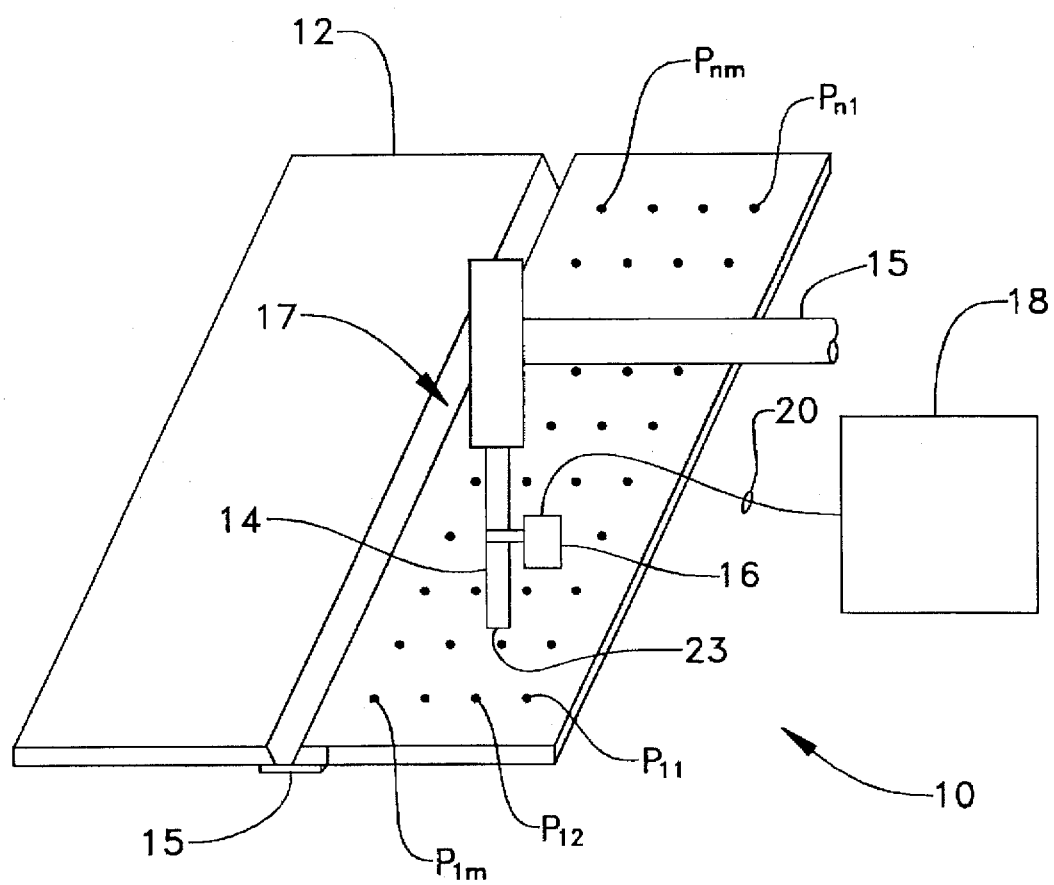
Fig_1_

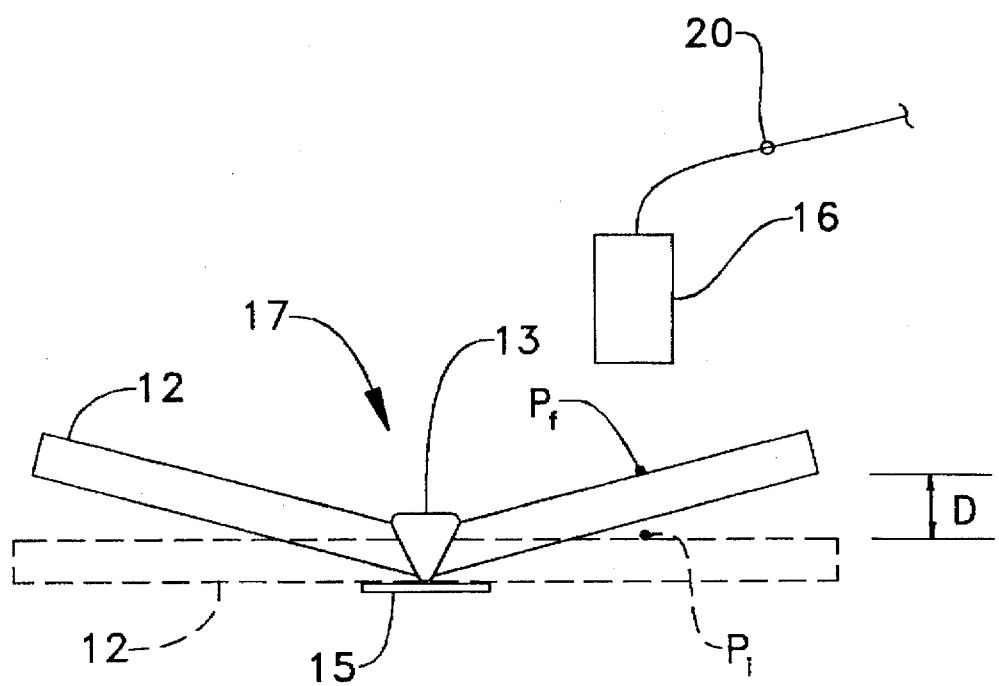
Fig_2_

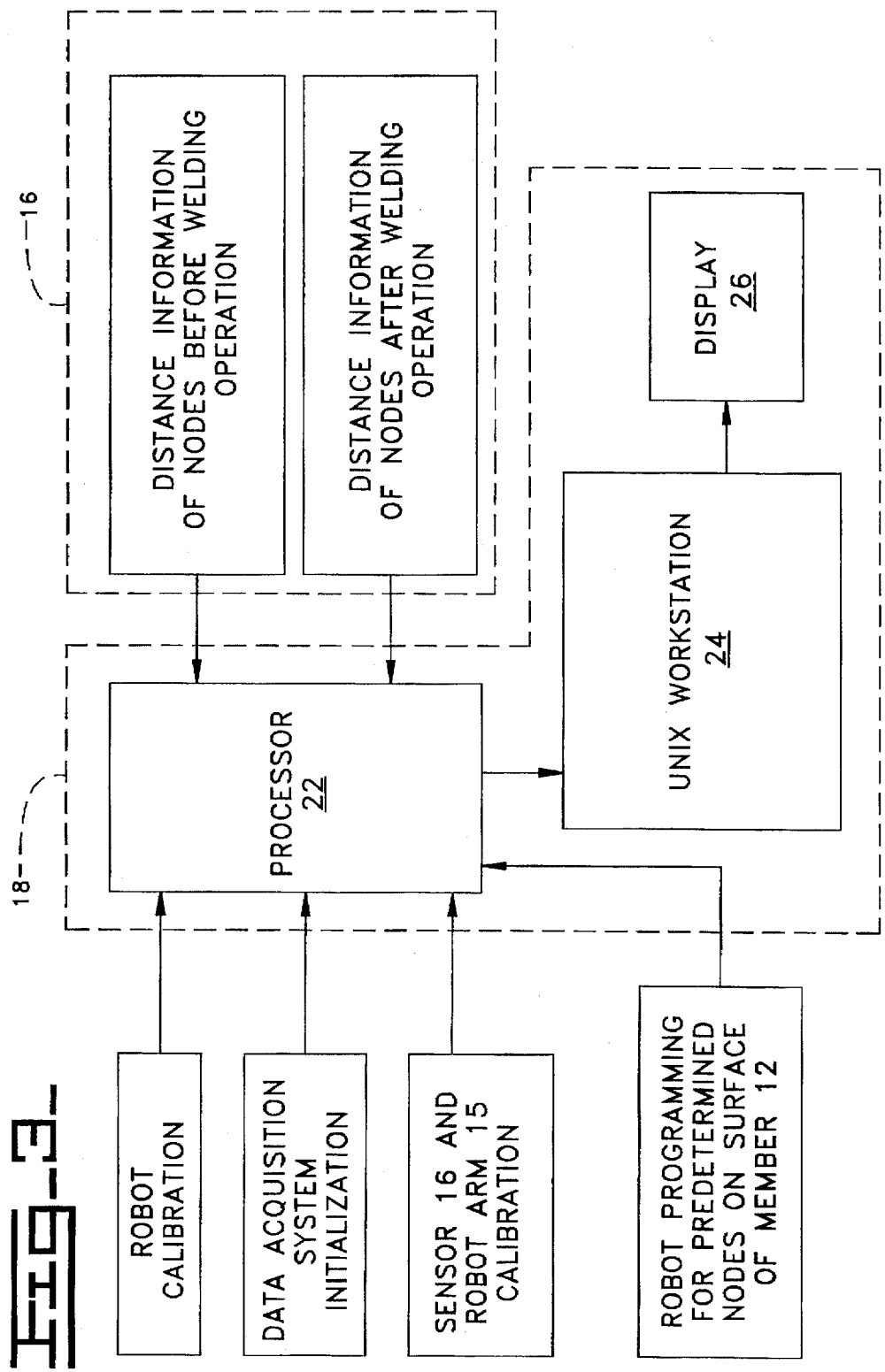

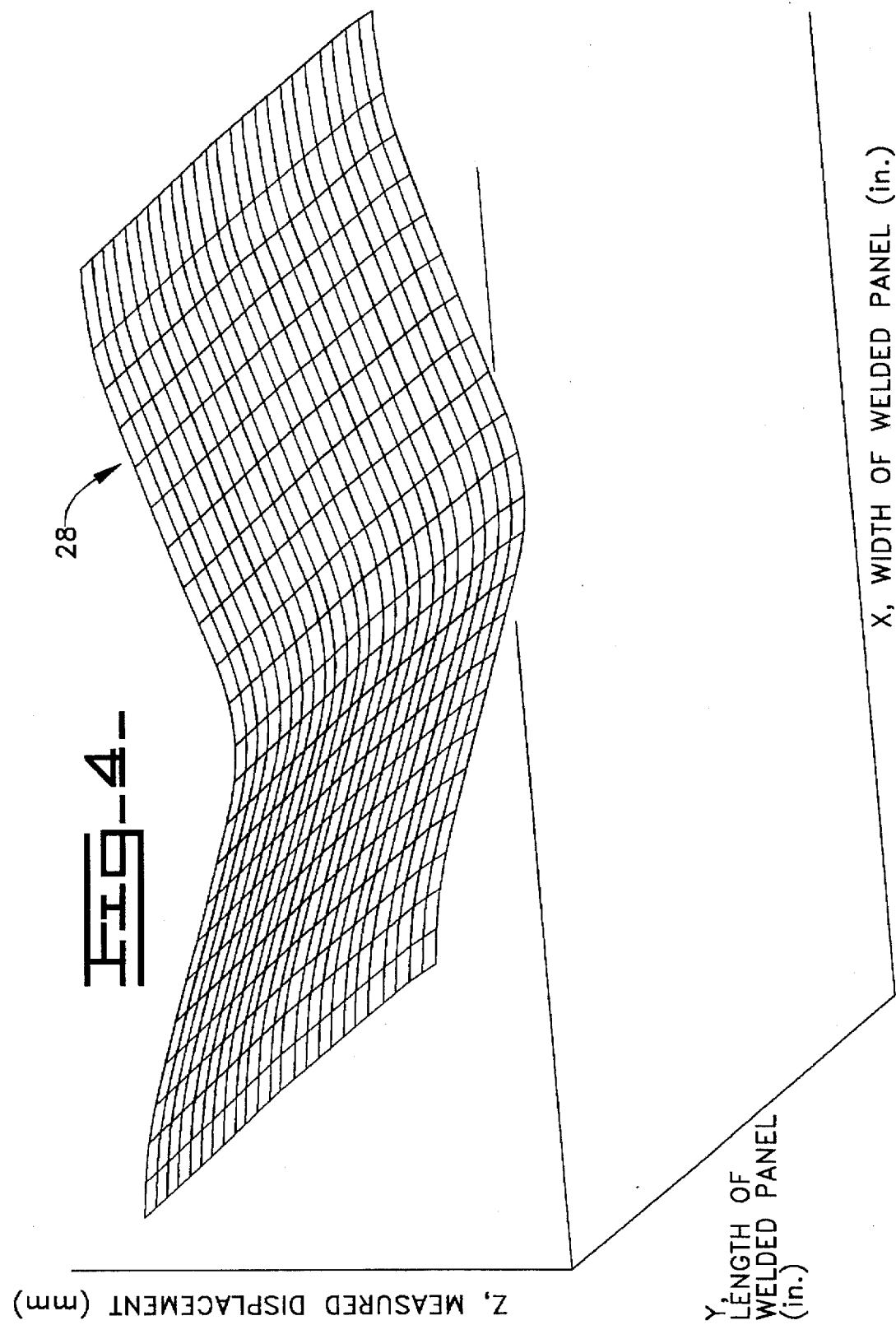

APPARATUS AND METHOD FOR DETERMINING DISTORTION OF A WELDED MEMBER

TECHNICAL FIELD

The present invention relates generally to measuring distortion of a member which results from the member being subjected to a welding operation.

BACKGROUND ART

During a welding operation, parameters of a welding system are set to certain values. These parameters may include voltage, current and welding torch travel speed in the associated welding system. A member which is subjected to the welding operation having these set parameters is typically caused to distort to some degree. It is desirable to acquire an understanding of the magnitude and character of this distortion for purposes of analysis. For example, knowing the magnitude and character of distortion in the welded member may be useful for optimization of the parameters of the welding operation. In other words, altering the parameters of the welding operation based on the known distortion caused by those parameters enables an operator to reset the parameters so that distortion is minimized or brought within design specification limits.

Prior approaches to measurement of distortion included physically moving the welded member from a welding area to a measurement laboratory. Once physically located in the measurement laboratory, the welded member was subjected to various measurements to determine the magnitude and character of the distortion.

However, the act of physically moving the welded member from the welding area to the measurement laboratory is burdensome, time consuming and inconvenient. This is especially true in multiple pass thick section welds when the welding operation is interrupted after a number of weld passes so that the member can be physically moved from the welding area to the measurement laboratory so that measurements can be performed when there is a need to determine distortion before completion of the welding operation.

DISCLOSURE OF THE INVENTION

According to one embodiment of the present invention, a method for determining distortion of a member which results from the member being subjected to a welding operation is disclosed. The method comprises the following steps:

locating the member so that the member assumes a first position;

obtaining first data measurements of the member while the member is located in the first position;

performing the welding operation on the member whereby the member distorts and assumes a second position;

obtaining second data measurements of the member while the member is located in the second position; and calculating distortion of the member based on the first data measurements and the second data measurements.

According to another embodiment of the present invention, an apparatus for determining distortion of a member which results from the member being subjected to a welding operation is disclosed. The apparatus includes:

a welding torch;

a sensor for detecting distance between the member and the sensor and generating distance signals in response thereto, the sensor being secured in fixed positional relationship to the welding torch; and a computer system for receiving distance signals from the sensor and generating distortion values based on the distance signals.

Pursuant to another yet embodiment of the present invention, an apparatus for determining distortion of a member is disclosed. The apparatus includes:

a welding torch for applying heat to the member so as to cause the member to distort and move from a first position to a second position;

a sensor for detecting (1) a set of first distances between the member and the sensor while the member is located at the first position, and (2) a set of second distances between the member and the sensor while the member is located at the second position; and a computer system for generating a set of distortion values based on the set of first distances and the set of second distances detected by the sensor.

It is an object of the present invention to provide a new and useful method and apparatus for measuring distortion of a member in-situ which results from the member being subjected to a welding operation.

It is another object of the present invention to provide an improved method and apparatus for measuring distortion of a member which results from the member being subjected to a welding operation.

It is still another object of the present invention to provide a method and apparatus for measuring distortion of a welded member which is not burdensome, time consuming or inconvenient.

It is moreover another object of the present invention to provide a method and apparatus for measuring distortion of a welded member which is highly accurate.

It is additionally another object of the present invention to provide a method and apparatus for measuring distortion of a welded member which can be used to control welding parameters and welding sequence (i.e. process control) during the welding operation.

The above and other objects, features and advantages of the present invention will become apparent from the following description and attached drawings.

BRIEF DESCRIPTION OF THE DRAWINGS

FIG. 1 is a perspective view of a distortion determining apparatus which incorporates the features of the present invention therein, with the distortion determining apparatus shown positioned over a member to be welded.

FIG. 2 is a side elevational view of the member of FIG. 1 shown (in phantom) located at a first position prior to being subjected to a welding operation, and also shown (in solid lines) located at a second position subsequent to being subjected to the welding operation.

FIG. 3 is a block diagram of the sensor and the computer system of the distortion determining apparatus of FIG. 1.

FIG. 4 is a graphical representation of a surface plot which corresponds to a set of distortion values generated by the distortion determining apparatus of FIG. 1.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a distortion determining apparatus 10. The distortion determining apparatus 10 is used with a Gas Metal Arc Welding (GMAW) operation. The distortion determining apparatus 10 is positioned over a member 12 which is to be welded. In FIG. 1, the member 12 is shown in a first position prior to being subjected to the welding operation.

The distortion determining apparatus 10 includes a welding torch 14 which generates heat for the welding operation. The heat which is generated by the welding torch 14 is applied to a weld area 17 of the member 12. A back plate 15 is attached to the back of a single-V type joint of the member 12 near weld area 17 (see FIG. 1). A filler material 13 is melted and deposited at the weld area 17 in the joint gap of the member 12 (see FIG. 2).

The distortion determining apparatus 10 includes a robot (not shown) which is a six axis, articulated arm robot. For example, a six axis, articulated arm robot manufactured by Fanuc Robotics, North America of Auburn Hills, Mich. is a robot which is suitable for use in the present invention. The robot includes a robot arm 15 which is moved from location to location. The welding torch 14 is attached to the robot arm 15.

The distortion determining apparatus 10 further includes a sensor 16 and a computer system 18. The sensor 16 is secured in fixed positional relationship to the welding torch as shown in FIG. 1. Since the sensor 16 is secured in fixed positional relationship to the welding torch 14, any movement of the welding torch 14 will cause a corresponding movement of the sensor 16. An electrical lead 20 couples the sensor 16 to the computer system 18. The sensor 16 is non-contact laser sensor such as a model no. ANL1751 AC available from Matsushita Electronics of Japan. The computer system 18 includes a processor 22, a Unix workstation 24 and a display 26 (see FIG. 3). The processor 22 is coupled to the Unix workstation 24, while the Unix workstation is coupled to the display 26. The processor 22 is a Pentium processor available from Intel Corporation of Santa Clara, Calif.

Turning now to FIG. 2, the distortion determining apparatus 10 obtains first data measurements of the member 12 while the member 12 is located at a first position. In FIG. 2, the member 12 is shown in phantom in the first position. The welding torch 14 (not shown in FIG. 2 for clarity of description) then applies heat to the member 12 during a welding operation whereby the member 12 distorts and assumes a second position. In FIG. 2, the member 12 is shown in solid lines in the second position. Thereafter, the distortion determining apparatus 10 obtains second data measurements of the member 12 while the member 12 is located at the second position.

The manner in which the distortion determining apparatus 10 obtains first data measurements while the member 12 is located in the first position will be discussed in detail below. In particular, the distortion determining apparatus 10 positions the sensor 16 over a point Pi located on the member 12 while the member 12 is located in the first position as shown in FIG. 2. Then, the sensor 16 determines an initial distance Zi between the sensor 16 and the point Pi. Note that the point Pi is only one of many points P11 through Pnm over which the distortion determining apparatus 10 positions sensor 16 for distance measurements. Points P11 to Pnm comprise an array of points where there are m points in the direction of the x-axis and n points in the direction of the y-axis as shown in FIG. 1.

The manner in which the distortion determining apparatus 10 obtains second data measurements while the member 12 is located in the second position is similar to that discussed above with regard to obtaining first data measurements. In particular, the distortion determining apparatus 10 positions the sensor 16 over a point Pf located on the member 12 while the member is located in the second position as shown in FIG. 2. Then, the sensor 16 determines a final distance Zf between the sensor 16 and the point Pf.

Then, a distortion or displacement value D is generated by the computer system 18 according to the following formula:

$$D = Z_f - Z_i$$

It should be appreciated that distortion values are generated for all of a plurality of predetermined matrix points or nodes on the surface of the member 12 (e.g. P11 through Pnm—see FIG. 1).

Turning now to FIG. 3, the sensor 16 and computer system 18 are shown in more functional detail. In particular, prior to obtaining distance measurements with the sensor 16, certain initialization and calibration activities are performed.

First, robot calibration occurs. This calibration data is provided to the processor 22. For example, the calibration data may define a reference location for the Tool Center Point (TCP) of the robot. The tip 23 of the welding torch 14 may be the TCP of the robot and the reference location may be at point P11 (see FIG. 1).

Second, the data acquisition system (i.e. sensor 16 and computer system 18) is initialized. This initialization data is provided to the processor 22. For example, the initialization data may define the distance between the points or nodes (i.e. Pi) such as one inch or one-half inch on the surface of the member 12. The initialization data may also define the travel rate of the robot arm 15. In addition, the initialization data may define the dwell time of the robot arm (i.e. the time period during which the sensor is positioned over a point or node (Pi) by the robot arm 15). The dwell time of the robot arm may be equal to 1.5 seconds. The dwell time may include a stabilization period of 0.5 second and a measurement period of 1.0 second. This initialization data may be input to the software (e.g. LabView software) which is being executed by the processor 22.

Third, the sensor and robot arm calibration is accomplished. This calibration data is provided to the processor 22. For example, this calibration data may define the detection distance of the sensor 16 (i.e. a distance between the sensor 16 and point Pi on the member 12). The detection distance may be 75.0 mm. It should be noted that the detection distance is proportional to the detection range specified by the particular sensor so as to ensure appropriate resolution of the sensor. Moreover, the sensor 16 should not be located too close to the heating area of the welding torch 14 so that heat damage to the sensor 16 is avoided.

Fourth, robot programming is accomplished. This programming data is provided to the processor 22. For example, the robot is programmed to position the sensor 16 to take measurements at predetermined points or nodes (Pi) on the surface of the member 12 during predetermined time periods. Note that the sensor 16 should not take measurements during travel of the sensor 16 over the member 12. Measurements should be taken only when the sensor 16 is held stationary over a point Pi. Note that measurements should be taken after a stabilization period over the point Pi.

Initial distance information (i.e. Zi) of the points P11 to Pnm before the welding operation is provided from the sensor 16 to the processor 22. Then, final distance information (i.e. Zf) of the points P11 to Pnm after the welding operation is provided to the processor 22. The initial and final distance information is compiled into data files which are then transferred to the Unix workstation 24 so that the Unix workstation can calculate distortion values D according to the following formula:

$$D=Zf-Zi$$

Again, it should be appreciated that distortion values are generated for all of a plurality of predetermined matrix points or nodes on the surface of the member 12 (e.g. P11 through Pnm—see FIG. 1).

Once the distortion values are generated for all of the plurality of predetermined matrix points on the surface of the member 12, these values are display as a surface plot 28 on the display 26 as shown in FIG. 4. The x-axis and the y-axis of the graph of FIG. 4 together define the location of the points or nodes on the member 12 (e.g. P12 or Pnm). However, the z-axis of the graph of FIG. 4 represents the distortion or displacement of the member 12 at various points or nodes (e.g. P11 to Pnm) as a result of the welding operation. The x-axis and the y-axis are measured in inches, while the z-axis is measured in millimeters for better resolution.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method for determining distortion of a member which results from the member being subjected to a welding operation, comprising:

locating the member so that the member assumes a first position;

obtaining first data measurements of the member while the member is located in the first position;

performing the welding operation on the member whereby the member distorts and assumes a second position;

obtaining second data measurements of the member while the member is located in the second position; and calculating distortion of the member based on the first data measurements and the second data measurements.

2. The method of claim 1, wherein:

the first data measurements obtaining step includes the steps of (1) positioning a sensor at a sensor location, and (2) determining a first distance between the sensor and the member while the member is located in the first position, and the second data measurements obtaining step includes the steps of (1) positioning the sensor at the sensor location, and (2) determining a second distance between the sensor and the member while the member is located in the second position.

3. The method of claim 2, wherein:

the first distance determining step includes the step of generating a value Z(initial), the second distance determining step includes the step of generating a value Z(final), and the calculating step includes the step of subtracting the value Z(initial) from the value Z(final) so as to arrive at a distortion value.

4. The method of claim 1, wherein the performing step includes the steps of:

providing a welding torch, and performing the welding operation on the member with the welding torch.

5. The method of claim 4, wherein the first data measurements obtaining step includes the steps of:

securing a sensor in fixed positional relationship to the welding torch, and determining a first distance between the sensor and the member while the member is located in the first position.

6. The method of claim 5, wherein the second data measurements obtaining step includes the step of determining a second distance between the sensor and the member while the member is located in the second position.

7. The method of claim 1, wherein the calculating step includes the step of generating a plurality of distortion values based on the first data measurements and the second data measurements.

8. The method of claim 7, further comprising the steps of displaying a surface plot on a display screen which corresponds to the plurality of distortion values.

9. An apparatus for determining distortion of a member which results from the member being subjected to a welding operation, comprising:

a welding torch;

a sensor for detecting distance between the member and the sensor and generating distance signals in response thereto, said sensor being secured in fixed positional relationship to said welding torch; and a computer system for receiving distance signals from the sensor and generating distortion values based on the distance signals, wherein said welding torch generates heat which is applied to a weld area located on the member, wherein said sensor generates (1) initial distance signals prior to application of heat to the weld area, and (2) final distance signals subsequent to application of heat to the weld area, and wherein said computer system generates distortion values based on the initial distance signals and the final distance signals.

10. The apparatus of claim 9, wherein said computer system includes a display screen for displaying a surface plot which corresponds to the distortion values.

11. The apparatus of claim 9, wherein:

one of the initial distance signals is equal to a value Z(initial), one of the final distance signals is equal to a value Z(final), and one of the distortion values is equal to the value D such that:

$$D=Z(final)-Z(initial).$$

12. An apparatus for determining distortion of a member, comprising:

a welding torch for applying heat to the member so as to cause the member to distort and move from a first position to a second position;

a sensor for detecting (1) a set of first distances between the member and the sensor while the member is located at the first position, and (2) a set of second distances between the member and the sensor while the member is located at the second position; and a computer system for generating a set of distortion values based on the set of first distances and the set of second distances detected by said sensor.

13. The apparatus of claim 12, wherein said computer system includes a display screen for displaying a surface plot which corresponds to the set of distortion values.

14. The apparatus of claim 13, wherein:

the set of first distances are equal to an array of values Z(initial), the set of second distances are equal to an array of values Z(final), and the set of distortion values are equal to an array of values D such that:

$$D = Z(final) - Z(initial).$$

15. The apparatus of claim 12, wherein said sensor is secured in fixed positional relationship to said welding torch.